United States Patent [19]
Matschinsky

[11] Patent Number: 4,589,677
[45] Date of Patent: May 20, 1986

[54] SUSPENSION FOR A RIGID AXLE FOR VEHICLES

[75] Inventor: Wolfgang Matschinsky, Munich, Fed. Rep. of Germany

[73] Assignee: Bayerische Motoren Werke A.G., Fed. Rep. of Germany

[21] Appl. No.: 651,322

[22] Filed: Sep. 17, 1984

[30] Foreign Application Priority Data

Sep. 17, 1983 [DE] Fed. Rep. of Germany ....... 3333706

[51] Int. Cl.$^4$ .............................................. B60G 9/02
[52] U.S. Cl. .................................. 280/726; 180/905; 267/63 R; 280/675; 280/716
[58] Field of Search ............. 280/675, 716, 724, 725, 280/726; 180/73.4, 905; 267/63 R

[56] References Cited

U.S. PATENT DOCUMENTS

| | | | |
|---|---|---|---|
| 3,467,421 | 9/1969 | Bentley | 267/63 R |
| 4,377,216 | 3/1983 | Ueno | 180/73.4 |

FOREIGN PATENT DOCUMENTS

| | | |
|---|---|---|
| 939793 | 3/1956 | Fed. Rep. of Germany . |
| 1242103 | 6/1967 | Fed. Rep. of Germany . |
| 1505697 | 8/1970 | Fed. Rep. of Germany ..... 180/73.4 |
| 2010561 | 9/1971 | Fed. Rep. of Germany . |
| 2029346 | 12/1971 | Fed. Rep. of Germany . |
| 2249913 | 4/1974 | Fed. Rep. of Germany ...... 280/725 |
| 3039051 | 5/1982 | Fed. Rep. of Germany ...... 280/726 |
| 3113049 | 10/1982 | Fed. Rep. of Germany . |

OTHER PUBLICATIONS

*Automobiltechnische Zeitschrift* 78 (1976) 10 pp. 411 and 413.
*Auto Motor und Sport* Aug. 1979 p. 91.

Primary Examiner—John J. Love
Assistant Examiner—Kenneth R. Rice
Attorney, Agent, or Firm—Craig and Burns

[57] ABSTRACT

A suspension for a rigid axle of vehicles which includes an axle body extending transversely to the driving direction, at the two ends of which is supported one wheel each. The axle body is connected with the vehicle body by way of two lateral longitudinal arms and is connected and guided with respect to the vehicle body by way of a lateral guide arrangement. The longitudinal arms are constructed bending- and torsion-rigid and are pivotally connected at the vehicle body in a rubber-elastic pivot bearings having a wide bearing base and pivot axis arranged substantially transversely and horizontally. The longitudinal arms are also connected to the torsion-rigid axle body by way of rubber-elastic pivot bearings having a wide bearing base, whose pivot axes extend, as viewed in plan view, at an inclination and intersect with the pivot axes of the longitudinal arms on the side of the body in a point at least approximately in the vehicle center plane.

12 Claims, 6 Drawing Figures

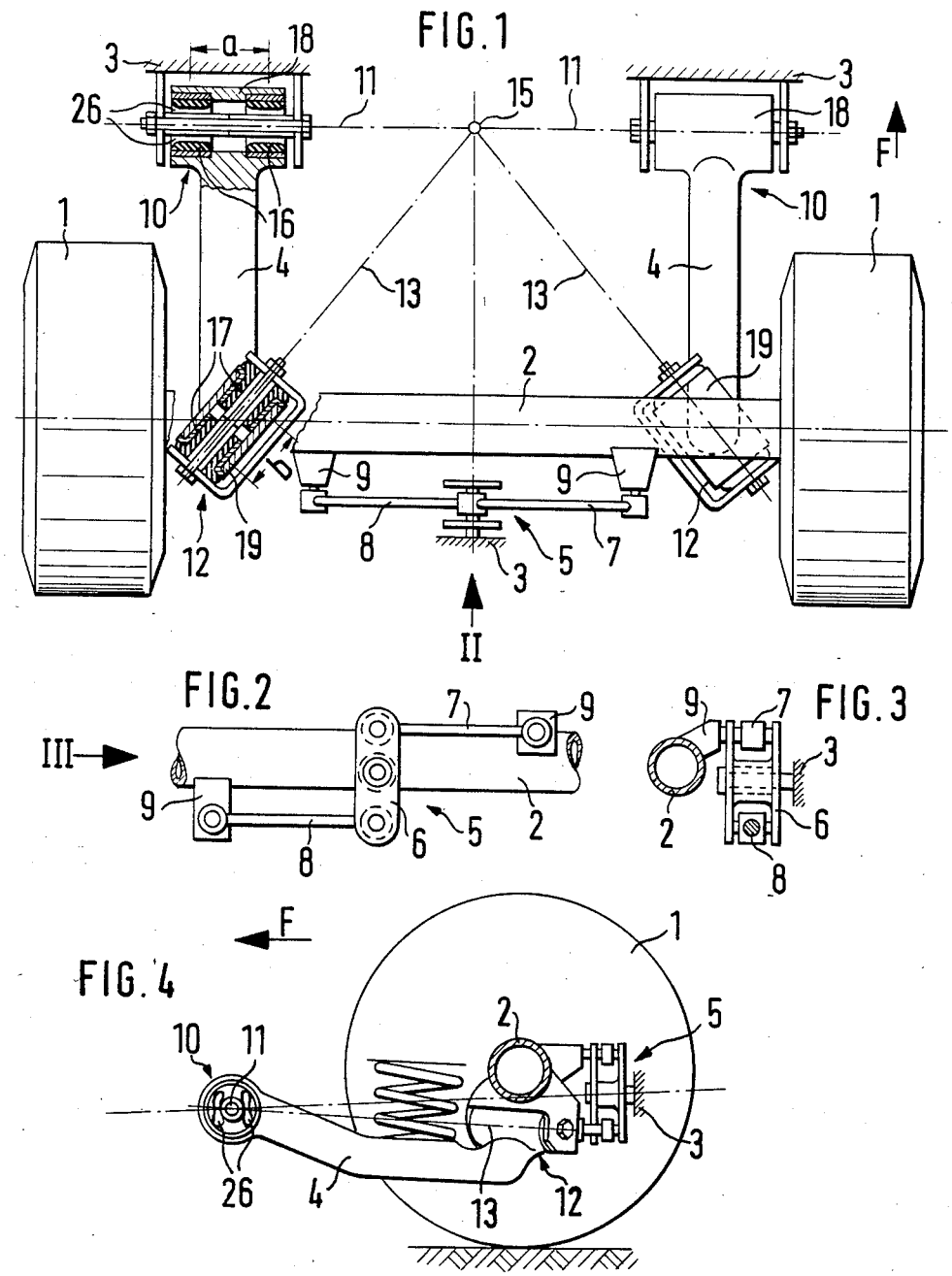

SUSPENSION FOR A RIGID AXLE FOR VEHICLES

The present invention relates to a suspension of a rigid axle for vehicles with an axle body extending essentially transversely to the driving direction, at the two ends of which one wheel each is supported, and which is connected and guided with the vehicle body by way of two lateral longitudinal guide members and a lateral guide arrangement (Panhard rod, Watt linkage).

In a known suspension of this type, the longitudinal arms are rigidly connected with the axle body. The axle body itself must therefore be constructed torsionally soft in order to enable an oppositely directed inward and outward spring movement of the vehicle wheels when driving through a curve or on a washboard-type road.

It is further known, for example, with rear axles of cross-country vehicles, to connect the longitudinal arms with the axle body on a broad base on two elastic bearings each arranged one behind the other in the driving direction. A relative vertical movement of the two longitudinal arms is then possible with respect to one another by deformation of the bearings.

The torsionally soft axle bodies of the first-mentioned type of construction with rigidly connected longitudinal arms result in high material loads and stresses at the connecting places between axle body and longitudinal arms which limit the permissive relative vertical movements and joggling of the longitudinal arms and therewith the spring deflections or travels when driving through curves.

Additionally, the dimensioning of the parts becomes difficult with heavy vehicles. The longitudinal arms are furthermore constructed customarily as vertically arranged spring leaves and frequently are not suited for the support of springs and dampers or shock absorbers.

The elastic connection of the longitudinal arms adapted to be joggled with a torsion-resistant axle body entails the disadvantage that the elastic pivoting permitted between axle body and longitudinal arms becomes effective on the axle body during the application of brake and driving moments. The axle body can wind itself up elastically and is additionally exposed to the danger of torsional vibrations during the braking and accelerations. Furthermore, the elastic torsion or pivot angles of the axle body increase the bending angles of the universal joint shaft or cardan shaft.

The present invention is concerned with the task to provide a suspension of a rigid axle for vehicles of the aforementioned type which has a construction as simple as possible with these types of suspensions, yet nonetheless avoids the described shortcomings as regards spring travel, loadability and elastic wind-up.

The underlying problems are solved according to the present invention with a suspension of a rigid axle of the aforementioned type in that the longitudinal guide members are bending- and torsion-resistant longitudinal arms which are pivotally connected at the vehicle body in rubber-elastic pivot bearings with a wide bearing base and with an approximately transversely and horizontally arranged pivot axis and are connected with the torsion-resistant axle body also by way of rubber-elastic pivot bearings with a wide bearing base, whose pivot axes extend obliquely as viewed in plan view and intersect with the pivot axes of the longitudinal arms on the side of the body approximately in the vehicle center plane at least approximately in a point. Owing to these measures, a space-saving type of construction with relatively low guide members can be realized for driven as also for non-driven rigid axles. With the arrangement of the longitudinal arm bearings in accordance with the present invention, the suspension operates kinematically nearly exactly under all operating conditions so that only secondary slight elastic distortions of the individual pivot bearings occur. In the directions in which this is desired, these bearings can be constructed therefore nearly as rigid as desired. The torsional load on the axle body is avoided, as also a spring travel or deflection limitation by non-permissive deformations of the axle body or the longitudinal arms. The suspension is also suitable for any desired large loads.

Finally, with a driven rigid axle, the differential gear can be connected without difficulties at the torsion-resistant axle body, respectively, can be integrated into the same. By reason of the broad-base pivot bearings and thanks to the bending- and torsion-resistant longitudinal arms, the elastic "winding-up" is thereby additionally significantly reduced during the application of driving or braking moments.

These and other objects, features and advantages of the present invention will become more apparent from the following description when taken in connection with the accompanying drawing which shows, for purposes of illustration only, several embodiments in accordance with the present invention, and wherein:

FIG. 1 is a plan view, partly in cross section, on a first embodiment of a rigid axle suspension in accordance with the present invention;

FIG. 2 is a partial view, taken in the direction of arrow II of FIG. 1;

FIG. 3 is a view taken in the direction of arrow III of FIG. 2;

FIG. 4 is a side elevational view of the suspension according to FIG. 1;

Figure 5:
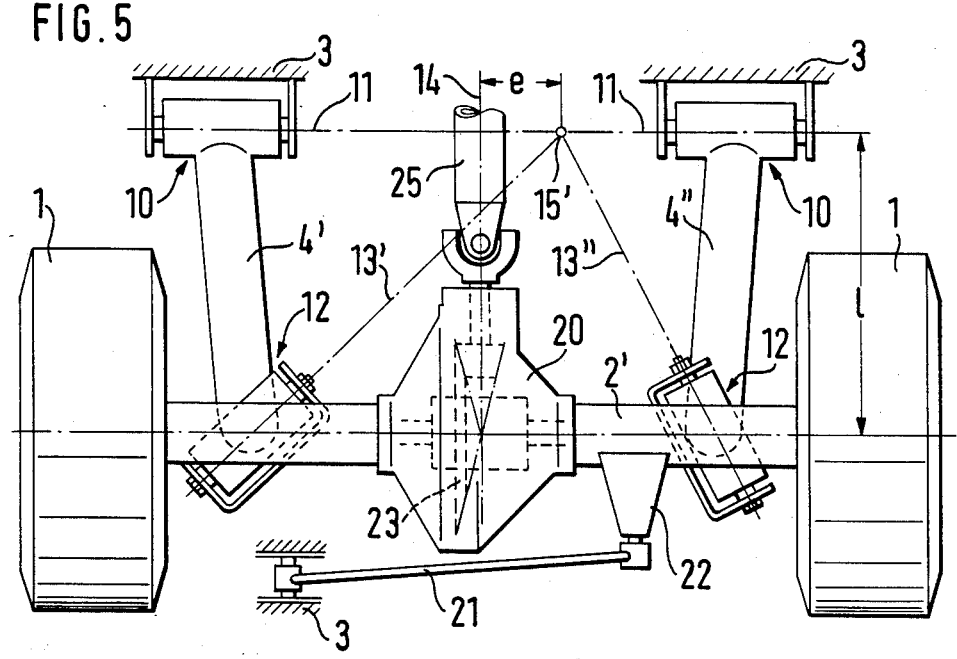
FIG. 5 is a plan view on a further embodiment of a suspension in accordance with the present invention.

Referring now to the drawing wherein like reference numerals are used throughout the various views to designate like parts, the suspension of a rigid axle illustrated in FIGS. 1-4 serves for the non-driven rear wheels 1 of a passenger motor vehicle. It includes an axle body 2 extending transversely to the driving direction F, at the two ends of which is supported one wheel 1 each. The axle body 2 is connected and guided with the only schematically indicated vehicle body 3 or the like by way of two lateral longitudinal guide members 4 and a lateral guide arrangement generally designated by reference numeral 5, which in this embodiment consists of a Watt linkage. This Watt linkage consists of a couple 6 supported in the normal position of the vehicle approximately vertically and fixed in its center at the vehicle, at the two ends of which pivotally engage an upper and a lower rod 7 and 8, respectively, which are pivotally connected at their opposite ends with brackets 9 of the axle body 2.

The two mentioned longitudinal guide members are bending- and torsion-resistant longitudinal arms 4 which are pivotally connected at the vehicle body 3 in rubber-elastic pivot bearings generally designated by reference numeral 10 with a wide bearing base a and a pivot axis 11 arranged transversely and horizontally.

The longitudinal arms 4 are further connected with the torsion-resistant axle body 2 also by way of rubber-elastic pivot bearings generally designated by reference numeral 12 with an also wide bearing base b, whose pivot axes 13 extend at an inclination, as viewed in plan view (FIG. 1), and intersect in a point 15 with the pivot axes of the longitudinal arms 4 on the side of the body approximately in the vehicle center plane 14. With unidirectional inward spring movement of the two wheels 1, the entire axle pivots upwardly about the pivot axis 11 of the two forward pivot bearings 10. With oppositely directed spring movements, one of the two longitudinal arms pivots upwardly while the other pivots downwardly, whereby pivot movements about the pivot axis 13 also take place relative to the axle body 2. Since the two pivot axes 13 intersect with the pivot axis 11 in a common point of intersection, the point 15, no significant distortions occur thereby in all of the pivot bearings 10 and 12, respectively.

For purposes of obtaining the wide bearing base a, respectively, b, the pivot bearing 10, respectively, the pivot bearing 12 is formed by two rubber bearings 16, respectively, 17 arranged at an axial distance from one another. The two rubber bearings 16 are received in a transversely extending pivot extension 18 at the forward end of the longitudinal arm 4, whereas the rubber bearings 17 are inserted into a pipe member rigidly attached at the rear end of the longitudinal arm 4 at an inclination corresponding to the pivot axis 13.

The embodiment of FIG. 5 relates to the rear, driven rigid axle of a motor vehicle. The differential gear housing 20 and the axle body 2', properly speaking, thereby form a fixedly connected unit which is laterally guided by way of a Panhard rod 21 which, on the one hand, is pivotally connected at the vehicle body 3 and, on the other, at a bracket 22 of the axle body 2'.

The longitudinal arms 4' and 4" which are slightly inclined from the rear inwardly toward the front outwardly, as viewed in plan view, are also pivotally connected at the vehicle body at the front thereof in broad-base pivot bearings 10, as already described by reference to FIGS. 1 to 4, and are pivotally connected in the rear to the axle body 2' by means of also wide-base pivot bearings 12 having also a wide bearing base. The pivot axes 11 of the forward pivot bearings 10 of the bending- and torsion-resistant longitudinal arms 4' and 4" intersect with the pivot axes 13' and 13" of the rear pivot bearings 12 not exactly in the vehicle center plane 14 but in the point 15' which is laterally offset with respect to the vehicle center plane 14. The point 15' is thereby offset to the side opposite the (merely indicated) spur bevel gear 23 of the differential gear. The lateral offset e amounts to 1/i whereby 1 is the longitudinal spacing of the pivot bearings 10 from the wheel axis 24 and i is the speed reduction ratio of the differential gear. In this manner, the wheel load displacement caused by the torque of the cardan shaft 25 can be compensated for.

The cardan shaft 25—in contrast to the illustration according to FIG. 5—may also be flangedly connected at the differential gear by means of an elastic shaft coupling which compensates only a small bending angle, if the cardan shaft is divided by a shaft joint that is located approximately in the axis of rotation 11 of the pivot bearings of the longitudinal arms 4, respectively, 4' and 4" on the side of the body.

As can be seen from FIG. 1 and, in particular from FIG. 4, the rubber-elastic pivot bearings 10 on the side of the body are provided with recesses or apertures 26 in the horizontal direction which bring about a soft spring absorption of longitudinal shocks on the vehicle. In the vertical direction, however, all rubber bearings are constructed as stiffly as permitted.

Figure 6:
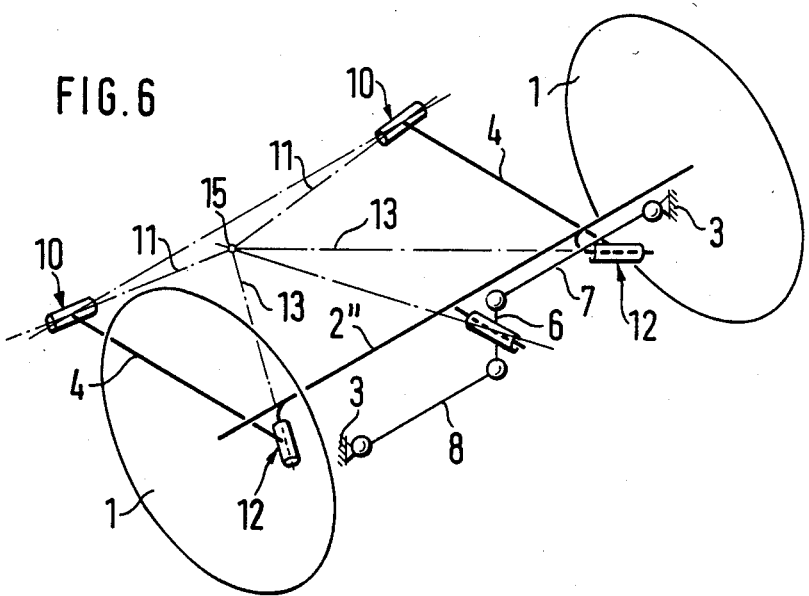
FIG. 6 is a perspective view of a third embodiment of a suspension in accordance with the present invention.

It can seen from this schematic view of FIG. 6 that the pivot axes 11 and the pivot axes 13 of the pivot bearings 10 and 12 need not necessarily lie in the same plane. They may be so inclined to one another that the point of intersection 15 lies underneath the pivotal connection of the longitudinal arms on the body side.

In the embodiment according to FIG. 6, the couple 6 of the Watt linkage is further supported at the axle body 2" whereas the ends of the rods 7 and 8 opposite the couple 6 are pivotally connected with the vehicle body 3. The kinematic bump steer behavior of the vehicle thereby changes slightly with the load condition.

If, in contrast thereto, as shown in the embodiment according to FIGS. 1–5, the lateral guide arrangement 5 is a Watt linkage whose couple 6 is supported at the vehicle body, then the point 15 and the bearing pin of the couple move during inward and outward spring movement approximately by the same amount in the vertical direction whereby the kinematic bump steering behavior becomes approximately independent of load.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A suspension of a rigid axle for vehicles, comprising axle body means extending essentially transversely to the driving direction, a wheel supported at each of the two ends of the axle body means, two longitudinal guide members being laterally offset with respect to each other and operatively connecting the axle body means at a fixed vehicle part, lateral guide means operatively connecting the axle body means at the fixed vehicle part and guiding the same with respect thereto, the longitudinal guide members being bending- and torsion-resistant longitudinal arm means which are pivotally connected at the fixed vehicle part in a first rubber-elastic-like pivot bearing means having a relatively wide bearing base and arranged approximately transversely and horizontally, said longitudinal arm means being operatively connected with the torsion-rigid axle body means by way of a second rubber-elastic-like pivot bearing means having a relatively wide bearing base, whose pivot axes extend at an inclination as viewed in plan view, the pivot axes of said second pivot bearing means intersecting the pivot axes of the longitudinal arm means on the side of the body approximately in the vehicle center plane at least approximately in a point.

2. A suspension according to claim 1, wherein each of the pivot bearing means include two rubber bearings arranged at an axial distance from one another.

3. A suspension according to claim 1, for a driven rear axle of a motor vehicle, in which a differential gear with a spur bevel gear is supported at the axle body means, the point of intersection of the pivot axes of the second pivot bearing means and of the pivot axes of the first pivot bearing means being offset with respect to the vehicle longitudinal center plane toward the side opposite the spur bevel gear of the differential gear.

4. A suspension according to claim 3, wherein the lateral offset e is equal to 1/i, whereby 1 is the longitudinal spacing of the first-mentioned pivot bearing means from the wheel axis and i is the speed reduction ratio of the differential gear.

5. A suspension according to claim 1, wherein the first-mentioned pivot bearing means are provided with apertures in the horizontal direction.

6. A suspension according to claim 1, wherein the pivot axes of the second and first pivot bearing means are so inclined to one another that the point of intersection thereof lies below the first-mentioned pivot bearing means of the longitudinal arm means.

7. A suspension according to claim 1, wherein the lateral guide means is a Watt linkage having a couple supported at the axle body means.

8. A suspension according to claim 1, wherein the lateral guide means is a Watt linkage having a couple supported at the fixed vehicle part.

9. A suspension according to claim 1, wherein the relatively fixed part is formed by the vehicle body.

10. A suspension according to claim 2, wherein the first-mentioned pivot bearing means are provided with apertures in the horizontal direction.

11. A suspension according to claim 10, wherein the lateral guide means is a Watt linkage having a couple supported at the axle body means.

12. A suspension according to claim 10, wherein the lateral guide means is a Watt linkage having a couple supported at the fixed vehicle part.

* * * * *